United States Patent [19]
Canale et al.

[11] 3,913,316
[45] Oct. 21, 1975

[54] TURBINE ENGINE CONTROL SYSTEM

[75] Inventors: Raymond P. Canale, Warren; Wesley J. Ross, Sterling Heights, Mich.

[73] Assignee: Colt Industries Operating Corporation, New York, N.Y.

[22] Filed: Jan. 11, 1974

[21] Appl. No.: 432,749

Related U.S. Application Data

[62] Division of Ser. No. 203,313, Nov. 30, 1971, Pat. No. 3,777,482.

[52] U.S. Cl. ......... 60/39.25; 60/39.17; 60/39.28 R; 137/625.64
[51] Int. Cl.² .................. F02C 9/02; F02C 3/10
[58] Field of Search .................. 60/39.25

[56] References Cited
UNITED STATES PATENTS

| | | | |
|---|---|---|---|
| 3,621,657 | 11/1971 | Jurisch | 60/39.25 |
| 3,777,479 | 12/1973 | Hagen | 60/39.25 |
| 3,780,527 | 12/1973 | Lewis | 60/39.25 |

Primary Examiner—Clarence R. Gordon

[57] ABSTRACT

A turbine engine control system, including a fuel control is provided with a fuel inlet, a fuel metering valve assembly responsive to electrical signals generated in response to engine speed and temperature and indicia of operator power request, a fuel bypass valving means for returning unmetered fuel from the area of the fuel metering valve assembly to an area of low pressure fuel, a compressor discharge pressure sensing means tending to further close the bypass valving means as compressor discharge pressure increases, and a pressure responsive means responsive to the differential in pressures which meters the fuel for opening said bypass valving means in order to achieve a rate of metered fuel flow corresponding to compressor discharge pressure; a variable nozzle assembly within an associated turbine engine is variably opened and closed by related control sections responsive at least in part to engine operating parameters.

1 Claim, 8 Drawing Figures

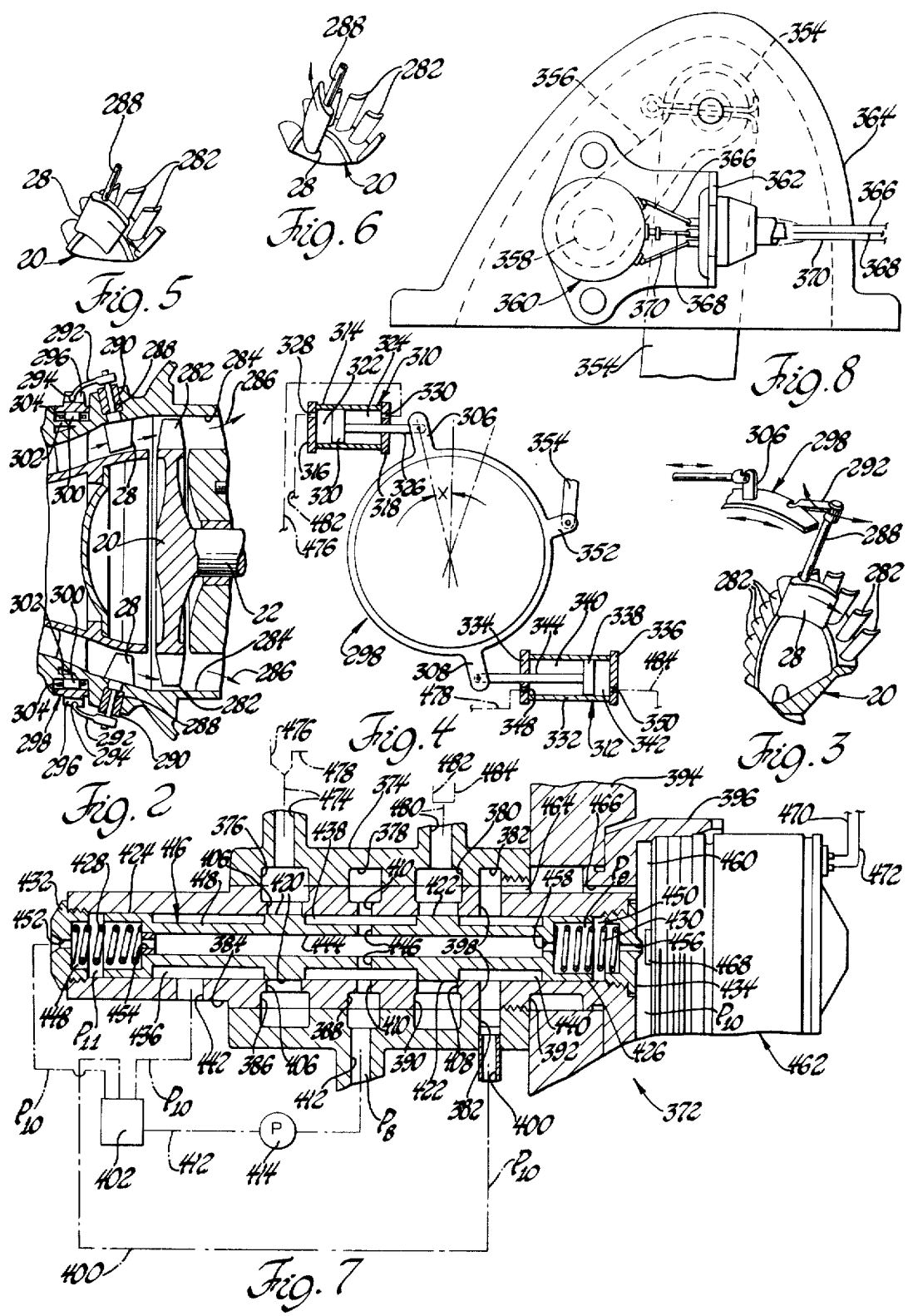

TURBINE ENGINE CONTROL SYSTEM

RELATED APPLICATION

This application is a division of our copending application Ser. No. 203,313 filed on Nov. 30, 1971 now U.S. Pat. No. 3,777,482.

BACKGROUND OF THE INVENTION

This invention relates generally to turbine engines and more particularly to engine control systems and fuel controls for use in combination with such engines.

Gas turbine engines may be classified broadly into three groups such as (1) turbojet, (2) turboprop and (3) turboshaft. The turbojet engine is one which relies upon jet thrust to develop its propulsive force, whereas, the turboprop has its turbine shaft coupled to a propeller, as well as the compressor, so as to develop its propulsive force by increasing the velocity of a large mass of air. The turboshaft engine differs from the turboprop in that the turbine shaft is coupled to an output shaft which drives something other than a propeller. Such output shaft may, for example, be a drive shaft for a land based vehicle as a truck or stationary power plant.

In the past it has been found desirable, in turboshaft engines, to provide an adjustable nozzle assembly, placed intermediate the gasifier section and the power turbine, for varying the direction of flow of the motive gases so as to thereby change the angle at which such gases impinge upon the blades of the power rotor or turbine and consequently vary the driving power supplied thereto.

According to prior practise, automotive vehicles or other engine applications employing turboshaft engines provided with such variable nozzle assemblies usually had mechanical and/or hydraulic linkage means interconnecting the vehicle operator's power lever and means sensing engine speed to the variable nozzle assembly for control thereof. Because of this, gas turbine engine controls of the prior art could not be readily integrated into the overall system so as to also be directly influenced by the various operating parameters.

Stated more generally, in most prior art turbine engine control systems, fuel flow has been scheduled on the basis of hydromechanical calculation of the correct flow for the control of engine parameters such as operator's power lever setting, engine speed and engine compressor discharge pressure. Similarly, power turbine nozzle position has been scheduled on the basis of hydromechanical calculation of the correct position for the control of engine speed and temperature. Such hydromechanical calculation constituted a compromise, since it did not utilize actual engine temperature as a means of control. Presently preferred means for sensing engine temperature, as well as other engine operating parameters, produce an electrical output. Therefore, a gas turbine engine control system based on engine temperature, for example, must be capable of responding to such electrical output signals.

Accordingly, the invention as herein disclosed concerns itself with the provision of a gas turbine engine control system which is completely compatible with a turboshaft engine employing a variable nozzle system, and particularly with use of electrical sensed parameters output signals.

SUMMARY OF THE INVENTION

According to the invention, a control system for a turbine engine having a gasifier section, a power output turbine and a variably operable nozzle assembly generally interposed between said gasifier section and said power turbine effective to at least at times variably restrict the flow to said power turbine of gases generated in said gasifier section, comprises fluid operated actuating means operatively connected to said variable nozzle assembly and effective to actuate said nozzle assembly to varying degress of opening, servo valve means situated generally between a source of pressurized actuating fluid and said actuating means for controlling the flow of said actuating fluid to said actuating means, control means effective to vary the position of said servo valve means, and additional means responsive to indicia of operation of said turbine engine and the degree of opening of said nozzle assembly for in turn creating and applying a control signal to said control means in order to thereby affect a desired movement of said servo valve means.

Various specific and general objects of the invention will become apparent when reference is made to the following detailed description of the invention, considered in conjunction with the accompanying drawings.

DESCRIPTION OF THE DRAWINGS

In the drawings, where for purposes of clarity certain details and elements may be omitted from one or more views:

FIG. 2 is an enlarged fragmentary cross-sectional view of a portion of the engine shown in FIG. 1;

FIG. 3 is a fragmentary perspective view of some of the elements in FIG. 2;

FIG. 4 is an end elevational view, of somewhat reduced scale, of certain of the elements shown in FIG. 2;

FIG. 5 is a fragmentary perspective view somewhat similar to FIG. 3 but showing a variable nozzle vane in one extreme operating position;

FIG. 6 is a view similar to FIG. 5 but showing a variable nozzle vane in another extreme operating position;

FIG. 7 is a longitudinal cross-sectional view of a control valve assembly for controlling the position of the variable nozzle vanes; and FIG. 8 is an elevational view of structure employed as means for sensing a feed-back signal from the variable nozzle vanes and for producing an output signal, to an associated control, indicative of such feed-back signal.

DESCRIPTION OF THE PREFERRED EMBODIMENT

Figure 1:
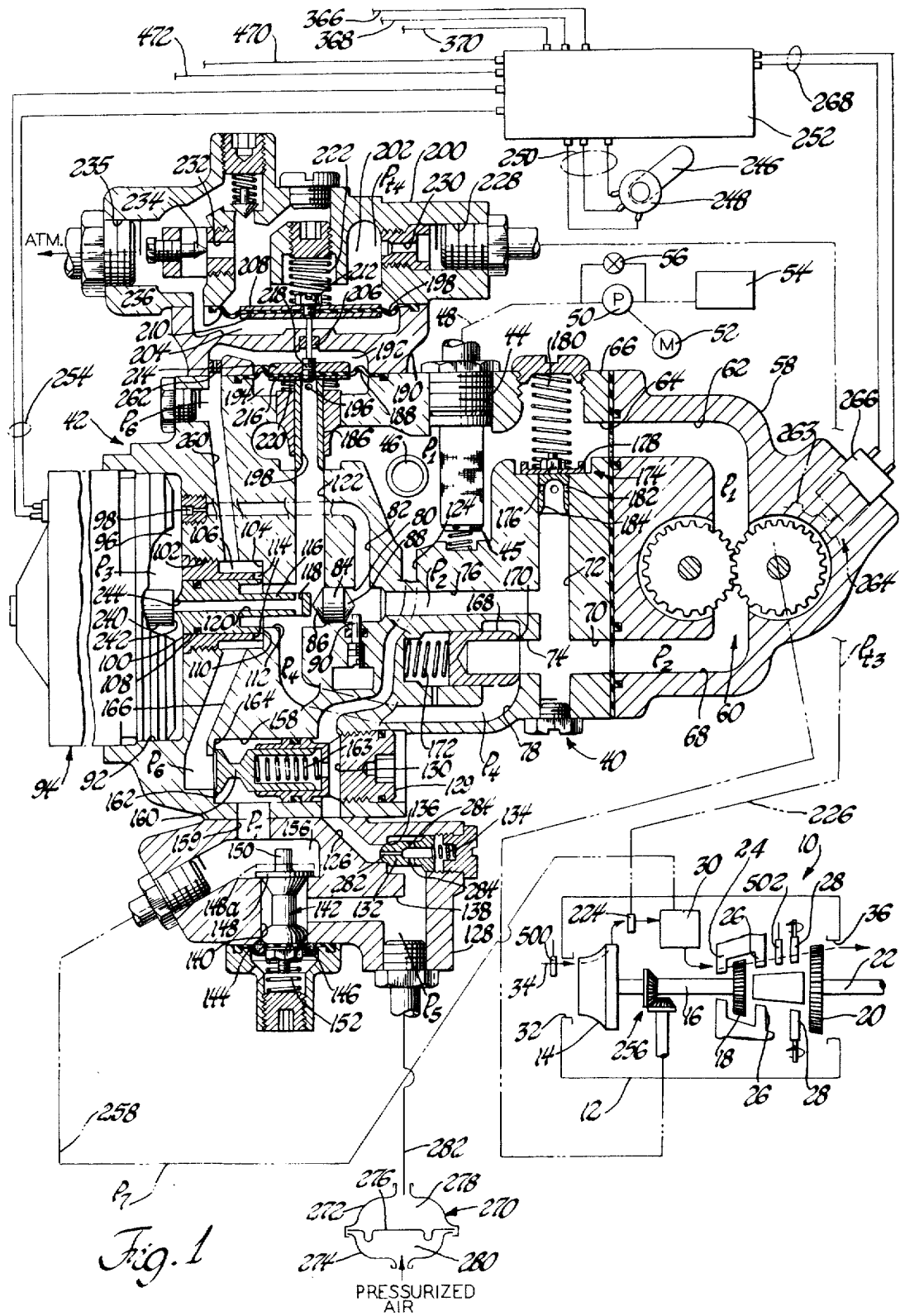
FIG. 1 is a schematic illustration in cross-section of a gas turbine engine control system and fuel control, embodying the invention, along with related structure.

Referring now in greater detail to the drawings, FIG. 1 illustrates, schematically, a split-type turbine engine 10 having a housing 12 with a compressor 14 mounted forwardly thereof and connected, as by a shaft 16, to a compressor turbine wheel 18. Rearwardly and downstream of the compressor turbine wheel 18 is a separate power or output turbine wheel 20 which is connected to a related output shaft 22 leading to any desired apparatus to be powered or driven thereby.

As generally schematically illustrated, the engine 10 includes fixed guide vanes 24 and 26, often referred to as stators, respectively upstream and downstream of the compressor turbine wheel 18. In contrast, immediately upstream of the power turbine wheel 20 the engine 10 includes a coaxial annular portion containing a circumferentially arranged set of adjustable nozzles or vanes 28 which determine the angle at which the hot gases from the gasifier section (generally comprised of compressor 14 and compressor turbine wheel 18) will impinge upon the blades of power turbine wheel 20 so as to vary the power imparted thereto.

As illustrated, air is drawn in through an intake 32 from where it flows, as shown by the arrowed line 34, to and through the compressor 14 and subsequently through the burner chamber 30. The air is then heated, and while undergoing expansion the hot air gases flow from the burner chamber 30 through stator section 24, compressor turbine wheel 18 (thereby driving wheel 18 and compressor 14), stator section 26, variable nozzle vanes 28 and ultimately power turbine wheel 20. The gases are then exhausted through outlet 36. Even though not shown, as is well known in the art, the exhausted gases may be directed to a suitable heat exchanger for recovering a major portion of the heat energy remaining in the gases before such are vented to the ambient atmosphere.

A fuel control 40, having a housing 42, is illustrated as comprising a fuel inlet 44 which communicates generally between a cavity or chamber 46 and a fuel supply conduit 48 communicating with a pump 50. In the preferred embodiment, pump 50 is of a relatively low pressure capacity and is driven as by an electric motor 52. For purposes of reference, this pump may be referred to as a boost pump. A fuel reservoir 54 supplies fuel to the inlet of pump 50 while a bypass return valve 56 may be provided, if desired, in order to return fuel to the inlet side of pump 50 in order to enhance pressure regulation of the output of pump 50.

A housing section 58 containing a gear pump assembly 60 has a first inlet conduit portion 62, communicating with chamber 46 as by means of a conduit 64 formed in the main housing section 66, and a second discharge conduit 68 communicating with a conduit 70 also formed in main housing section 66.

Conduit 70, as shown, is in communication with conduits 72 and 74 which, in turn, are either in or adapted for communication with conduits 76 and 78, respectively. An enlarged cylindrical passageway 80, communicating at one end with conduit 76 and also in communication with a branch conduit 82, closely slideably receives therein a piston-like member 84. As shown, piston 84 is provided with conical end surfaces 86 and 88 which, in addition to other characteristics to be described, provide an abutment surface for abutingly engaging a threadable minimum fuel flow stop 90. As shall be apparent, the more stop 90 is threaded inwardly (or upwardly as viewed in FIG. 1) piston 84 will engage stop 90 at a point whereat piston 84 will be farther to the left.

A recess 92 formed in housing section 66 threadably receives and retains a proportional solenoid assembly 94 in a manner as to define a chamber 96 therebetween which chamber is in communication with branch conduit 82 and a serially situated calibrating restriction 98. A sleeve member 100 is generally threadably received within a chamber 102 in a manner as to have its axial end abut and be sealed against the end 104 of chamber 102 and at the same time define an annular chamber 106 as between the outer surface of sleeve 100 and the inner surface of chamber 102.

A generally cylindrical fuel metering valve 108, slideably received within sleeve 100, includes an annular knife-edge like metering surface or edge 110 which, as will become apparent, controls the rate of fuel flow from a chamber 112 to the annular chamber 106 via a plurality of radially directed ports 114 formed in sleeve 100. Valve 108 also includes an axial extension 116 which is abutingly engaged by the piston stop member 84 and has a cross passageway 118 formed therein communicating with an axial passageway 120 leading to chamber 96. As can be seen, chamber 112 communicates with conduit 78 as well as with a second conduit 122 which, at times is placed in communication with chamber 46.

A branch conduit 124 communicating at one end with chamber 46 has its other end in communication with a conduit 126 formed in a housing section 128. A valve housing 129 threadbly received within housing section 66 is placed generally through conduit 124 but has a cross passage 130 formed therethrough so as to complete communication to the opposite portions of conduit 124. A check valve 132 is resiliently urged, as by a spring 134, against a cooperating seat 136 in order to at times terminate flow as between conduit 126 and conduit means 138 which, in turn, communicates with a cylindrical chamber 140. A spool-like valve 142, having one end 144 slideably received within chamber 140 and operatively connected to a diaphragm seal 146, has an upper end with a flange-like valving portion 148 and an axial extension 150. During certain periods of operation valve member 142 is moved upwardly by a spring 152 until the valve extension 150 abuts against the upper surface of conduit portion 156. At that time, the valving portion 148 will have moved to the position shown in phantom line at 148a thereby completing communication as between chamber 140 and conduit portion 156.

Referring again to the valve housing 129, it can be seen that a portion of it is received within a chamber 158 and, in turn, slideably receives a pressurizing valve 160 which has a valving end 162 resiliently urged, as by a spring 163, toward seated engagement with a cooperating seat 164 to thereby at times terminate communication as between chamber 158 and a conduit 166 leading to annular chamber 106. There are also times when the pressurizing valve 160 terminates communications between conduit 166 and chamber 158 for the purpose of elevating $P_4$ above $P_1$ to insure that valve 198 will function properly at low control back pressure levels.

A muscles valve 168 carried by housing section 66 has an annular valving edge 170 which is effective for varying the flow from conduit 74 to conduit 78 in accordance with the pressure. A spring 172 normally urges the valve 168 to the right as to thereby tend to terminate flow from conduit 74 to conduit 78.

A relief valve assembly 174 is comprised of a valve member 176 slideably received within conduit 72 and secured to a moveable spring perch 178 against which one end of a preloaded spring 180 reacts in order to preclude communication between conduit 72 and chamber 46. When the pressure in conduit 72 exceeds a predetermined minimum, valve 176 is moved upwardly sufficiently to expose radial passageways 182 to chamber 46 while the axial passageway 184 of valve 176 is in communication with conduit 72 thereby venting such excessive pressure to the relatively low pressure of chamber 46.

A bypass valve 186 operatively connected to a pressure responsive diaphragm assembly 188 is, as will become evident, normally urged downwardly toward a position closing communication between conduit 122 and chamber 46. Diaphragm assembly 188 may be suitably retained between housing 66 and a housing portion 190 so as to form two generally distinct but variable chambers 92 and 194. As will be noted, bypass valve 186, is provided with a plurality of radial passages 196 which continually complete communication between the interior 198 of bypass valve 186 and chamber 194.

A second diaphragm assembly 198 suitably secured between housing portion 190 and a housing portion 200, so as to form two generally distinct but variable chambers 202 and 204, is operatively connected to a motion transmitting pushrod 206 which is slidably received through a wall of housing portion 190 in a manner having its opposite ends generally received within chambers 204 and 192.

As can be seen, the diaphragm assembly 198 includes oppositely disposed diaphragm backing plates 208 and 210 which may be secured to each other, as to contain the diaphragm therebetween, by a suitable fastener 212 passing therethrough. Similarly, diaphragm assembly 188 may be provided with oppositely disposed diaphragm backing plates 214 and 216 which also may be secured to each other, as to contain the diaphragm therebetween, by a suitable fastener 218, which may be formed at one end of valve 186, passing therethrough. If desired, fastener 218 may be provided with a bore for receiving therein one end of pushrod 206. A compression spring 220 situated within chamber 194 normally resiliently urges the diaphragm assembly 188 upwardly while a compression spring 222 within chamber 202 resiliently urges the diaphragm assembly 198 downwardly thereby causing the pushrod 206 to be in abutting engagement at one end with the diaphragm assembly 188 and valve 186 and, at the other end, with the diaphragm assembly 198. (As specifically illustrated, the motion or force transmitting pushrod 206 may actually abut against fastener portions 212 and 218 of diaphragm assemblies 198 and 188, respectively).

Compressor discharge pressure, $P_{t3}$, sensed as by a probe 224 is directed to chamber 202 as by conduit means 226 and 228 and a restriction 230 in series therewith. Chamber 202, containing compression spring 222 normally urging diaphragm assembly 198 downwardly, communicates with the ambient atmosphere by means of a conduit 232 which also is effectively restricted as by an adjustaable restrictor 234. Because of the flow afforded by the combination of restrictions 230 and 234 the pressure, $P_{t4}$, within chamber 202, although related to the value of $P_{t3}$, will be of a value somewhat less than the value of $P_{t3}$. Chamber 204 communicates with the ambient atmosphere as by means of a conduit 236 which communicates with conduit 235 downstream of restriction 234. The spring-loaded horsepower limiter valve 209 is provided to limit $P_{t4}$ to a maximum level, regardless of the final magnitude of $P_{t3}$. $P_{t3}$ is generated by engine speed, which is influenced by ambient temperature, which can indirectly command the control to generate excessive horsepower. The limit on $P_{t4}$ directly limits the metered fuel.

Operation of Structure of FIG. 1

Generally, fuel at a pressure $P_1$ is supplied by pump 50 through conduits 48 and 44 and filter 45 to chamber 46 from where it flows through conduit 62 to be acted upon by the gear pump 60. The fuel thusly pumped by pump assembly 60 is discharged into conduit 68 at a high pressure, $P_2$, and flows at such a pressure into conduits 74, 72, 76, 80 and 82. Any flow from conduit 82 to chamber 96 must occur through restriction 98; consequently, the pressure within chamber 96 is of some lesser value, $P_3$.

The high pressure $P_2$ in conduit 74 exerted against the muscles valve 168 causes valve 168 to move to the left thereby allowing flow to occur as between conduit 74 and conduit 78 wherein with an accompanying pressure drop across valve 168 resulting in the fuel within conduit 78 being of some lesser pressure, $P_4$. Such a reduced pressure $P_4$ is also communicated, via conduit 78, to chamber 112 and bypass conduit 122. In view of the above, several things are best noted at this time. That is, first, the high pressure $P_2$ is applied against the effective area of surface 88 of piston like member 84 while the relatively lower pressure $P_4$ is applied against the effective area of end surface 86 of the same piston member 84. consequently, the differential of pressures $P_2$ and $P_4$ results in a force tending to move piston member 84 and fuel metering valve 108, against which it abuts, to the left. Secondly, the left end of the fuel metering valve 108 has its effective area exposed to pressure $P_3$, which is at a value less than $P_2$ but greater than $P_4$, while the right end of the metering valve 108 has its effective area exposed to pressure $P_4$. Accordingly, it can be appreciated that metering valve 108 is exposed to a system of forces tending to create motion of valve 108 in a manner generally set forth as follows.

The proportional solenoid assembly 94 includes a moveable armature portion 240 which has an end surface 242 formed to variably restrict flow through the left end 244 of passageway 120. Generally in accordance with the signal applied to the proportional solenoid, armature 240 will either not move from its then assumed position, move to the left or move to the right. If the signal applied to the solenoid assembly 94 in fact represents that the engine 10 is receiving the prior rate of fuel flow, armature end surface 242 will remain a slight distance away from end 244 of passageway 120 thereby permitting controlled flow to take place as from chamber 96 through passageway 120 and cross passageway 118 and into chamber 112. If the signal applied to solenoid assembly indicates that a reduction in the rate of fuel flow to the engine is required, armature 240 will start to move to the right thereby tending to close the left end of passageway 120 thereby effectively increasing the restriction to flow therethrough. As this happens the value of pressure $P_3$ increases tending to approach the value of pressure $P_2$ and in so doing causes a pressure differential across the ends of valve 108 of such a magnitude resulting in an unbalanced force moving metering valve 108 to the right further closing off metered fuel flow past metering edge 110. Such movement continues until the proper rate of metered fuel flow is attained at which time the system is again placed in hydraulic balance. If the signal applied to the solenoid assembly indicates that an increase in the rate of metered fuel flow is desired, armature 240 and end surface 242 start to move to the left tending to move away from the left end 244 of passageway 120 thereby effectively decreasing the restriction to flow therethrough. As this happens the value of pressure $P_3$ decreases tending to approach the value of pressure $P_4$ and in so doing causes a pressure differential across the ends of valve 108 of such a magnitude resulting in an unbalanced force moving metering valve 108 to the left, further increasing metered fuel flow past metering edge 110. Such movement continues until the proper rate of metered flow is attained at which time the system is again placed in hydraulic balance. The preceding is by way of general description so that the following can be better understood.

The following conditions will be considered and described; (1) engine cranking; (2) steady state operation; (3) acceleration or increased power; and (4) deceleration or decreased power.

At engine shut down and prior to cranking: (a) the boost flow valve 142 will be in its uppermost position abuting against the upper surface of conduit means 156 thereby opening or completing communication as between conduits 156 and 138 through chamber 140; (b) pressurizing valve 160 will be held against its seat 164 by spring 163 thereby closing communication between conduits 166 and chamber 158 which communicates with conduit 156 as by conduit means 159; (c) bypass valve 186 will be in a closed position as illustrated; (d) muscles valve 168 will be held close by spring 172 thereby closing communication as between conduits 74 and 78; and (e) the check valve 132 will be held against its seat 136 by its spring 134.

At engine cranking or starting, the associated power lever 246 is rotated to a preselected position thereby adjusting the setting of a related potentiometer 248 which, through circuit means 250, applies a particular signal to the electronic control means 252 causing, in turn, an appropriate signal to be applied via circuit means 254 to the proportional solenoid assembly 94. The motor 52 and pump 50 are then actuated causing fuel to be pumped into chamber 46 at a pressure $P_1$. 3.0

Because of the relatively slow engine speed during cranking pump assembly 60, driven as by gearing means 256 operatively connected to the gasifier section or shaft 16, is generally ineffective to sufficiently raise the pressure of the fuel in order to activate the various valves etc. downstream thereof. Therefore, during cranking fuel at pressure $P_1$ flows from chamber 46 through conduit 124, conduit portion 130, and conduit 126 forcing the check valve 132 open (the drop across the check valve 132 may be in the order of 3.0 psi.) thereby permitting the fuel, now at a pressure $P_5$, to flow through conduits 138, 140, 156 and 258 to the engine burner 30. Such action continues until engine ignition is achieved at which time, the engine compressor 14 and compressor turbine 18 begin to accelerate to achieve what may be termed idle engine speed.

By the time that such idle engine speed is achieved, pump assembly 60 has already started to deliver fuel into conduit 68 at a pressure $P_2$ which of a magnitude sufficient to actuate the various valves downstream. As previously described, pressure $P_2$ causes the muscles valve 168 to partially open resulting in fuel at a pressure $P_4$ being delivered to chamber 112. Also, pressure $P_3$ in chamber 96, brought about by the flow of fuel at a pressure $P_2$ through restriction 98, has caused the metering valve 108 to assume a partially (idle) open position as dictated by the armature 240.

As the fuel flows from chamber 112 past the metering edge 110 of metering valve 108, the pressure of such fuel drops to a value $P_6$ within annular chamber 106 and conduits 166 and 260. The fuel within conduit 166 at a pressure $P_6$ forces the pressurizing valve 160 open and flows into conduits 159, 156 and 258 at a pressure $P_7$ which, because of the pressure drop across the pressurizing valve 160, is slightly less than the value of pressure $P_6$. Nevertheless, pressure $P_7$ is more than sufficient to move spool-like valve 142 downwardly so as to hold the valving flange 148 thereof seated and thereby terminate further fuel flow from or to conduit means 138. As a consequence thereof, the check valve 132 goes closed by the force of spring 134. After the various valves etc. have moved to the positions described and the power lever 246 is not changed in its setting, continued operation of the engine may be considered as representative of a steady state operating condition.

It is generally desired to maintain a near constant ratio of weight rate of fuel flow to weight rate of engine air flow for purposes of control of engine temperature. Compressor discharge pressure, $P_{t3}$, is generally proportional to engine air flow. The restrictions 230 and 234 may be selected so that pressure $P_{t4}$ is related to the square of pressure $P_{t3}$. The bypass system, consisting generally of pushrod 206, and connected moveable components, acts to force pressure differential $P_4-P_6$ to be linearly related to pressure $P_{t4}$. Since fuel flow through or past metering edge 110 varies as the square root of $P_4-P_6$ it is linearly related to pressure $P_{t3}$ and therefore to engine air flow. This can be expressed by the following equation, where $K_1$, $K_2$ etc. are constants determined by component sizing:

1. $M_a = K_1 (P_{t3})$; where $M_a$ = engine air flow
2. $P_{t4} = K_2 (P_{t3})^2$
3. $P_4 - P_6 = K_3 (P_{t4})$
4. $W_f = K_4 \sqrt{P_4 - P_6}$; where $W_f$ = fuel flow
5. Combining the above: $W_f = K_5 (M_a)$ It should be noted that variation of the electrical signal to proportional solenoid 94 will cause the fuel valve to move, as previously described, and vary the value of $K_4$ in equation (4) above.

Let it now be assumed that increased engine power is desired. At this time the power lever 246 is rotated to the position desired (indicative of the power required) and a related signal, as previously described, is applied to the solenoid assembly causing metering valve 108 to move some distance to the left thereby further opening the metering edge 110. At this time, there is an initial tendency, because of the increased effective flow area defined by valve 108, for pressure $P_4$ to decrease. However, as should be observed, the pressure differential of $P_4 - P_6$ which exists at any particular moment across valve 108 is continually applied across the diaphragm assembly 188. Therefore, any tendency of $P_4$ to decrease is accompanied by an increase in the downward force applied to diaphragm assembly 188 tending to hold the bypass valve 186 closed thereby assuring that all available fuel will be metered through valve 108.

Accordingly, as fuel flow to the engine 10 is thusly increased, the speed of compressor 14, shaft 16 and turbine wheel 18 increased thereby causing: (a) pump assembly 60 to pump a greater rate of flow of fuel at an increased value of $P_2$; and (b) the value of the compressor discharge pressure $P_{t3}$ and pressure $P_{t4}$ to increase. As the valve of $P_{t3}$ and therefore $P_{t4}$ increases, the pressure differential $P_4-P_6$ increases as previously described until solenoid 94 commands metering valve 108 to close and maintain the newly desired gas generator speed. As the value of $P_2$ and therefore $P_4$ increases, the pressure differential of $P_4-P_6$ also increases until a predetermined value thereof (for the conditions established) is attained resulting in an upward force on diaphragm assembly 188 first equaling and then to a slight degree exceeding the force transmitted by pushrod 206 so as to open bypass valve 186 in order to bypass fuel from conduit 122 to chamber 46 at pressure $P_1$. Bypass valve 186 will continue to be moved toward and away from the closed position in order to maintain the particular pressure of $P_4-P_6$ so as to keep the engine operating at the new governed steady state condition whereat the engine is delivering increased power.

If deceleration or reduced power of the engine is desired, the power lever 246 is again rotated to the then selected position causing servo armature 240 to move to the right with the accompanying movement of metering valve 108. As this happens, the effective flow area of the metering valve 108 is reduced resulting in an immediate increase in the pressure differential of $P_4-P_6$ causing bypass valve 186 to move upwardly so as to bypass a greater quantity of fuel to chamber 46. Consequently, there is a reduction in the rate of metered fuel flow to the engine which, in turn, causes a reduction in compressor speed, a reduction in compressor pressure $P_{t3}$, a reduction in the speed of pump assembly 60 and a reduction in the value of pressure $P_2$. As such variables decrease, the values thereof eventually attain relationship, as described with reference to engine acceleration or increased power, resulting in a balancing of forces to again re-define a new steady-state operating condition of lower or lesser engine power.

It is contemplated that the manner in which the speed signal, $N_g$, used by the electronic control for governing would be produced is by employing a toothed wheel, fragmentarily shown in hidden line at 264, which would be rotated, as by a common drive with pump assembly 60, in accordance with the speed of the gasifier section of engine 10. A magnetic probe assembly 266 placed in close proximity to the wheel 264 would create an electrical pulse each time a tooth 263 of the wheel 264 passed into and out of juxtaposition with the probe assembly. Such pulses would be transmitted via circuit means 268 to the control 252 where suitable circuitry would integrate the pulses. That is, the number of pulses produced per unit of time will determine the magnitude of such signal.

In the preferred embodiment of the invention, additional means are provided for initially causing a quantity of fuel to be charged into the burner at the start of the engine cranking cycle. Such means is illustrated, in somewhat simplified manner as comprising a housing 270 having housing sections 272 and 274 between which a diaphragm 276 is retained in order to form chambers 278 and 280 on opposite sides thereof. During normal operation of the engine fuel is supplied through bleed or leak passages 282 and 284 in check valve 132 to chamber 278. The fuel thusly supplied to chamber 278 remains there after engine shut-down until the engine is again cranked for starting.

When the engine 10 is subsequently again cranked, air under pressure is forced into chamber 280 thereby moving diaphragm 276 and forcing the fuel out of there and into the burner 30 via conduits 282, 138, 140, 156 and 258 to thereby provided an initial charge of fuel even before the relatively low pressure fuel at $P_1$ has a chance to flow to the burner 30. Once the quantity of fuel is thusly delivered out of chamber 278, the air pressure in chamber 280 is relieved and the fuel, in the manner previously described, again flows into chamber 278. The diaphragm 276, of course, could be actuated by any suitable means other than air as, for example, by a solenoid assembly.

As previously mentioned, the engine 10 is provided with a variable nozzle assembly including variably positionable nozzle vanes 28. FIGS. 2, 3, 4, 5 and 6 illustrate, in somewhat greater detail, and by way of example, one particular arrangement which might be employed.

Referring now to greater detail in FIG. 2, it can be seen that immediately upstream of the blades 282 of the power turbine 20, the hot gas conduit system 284 conprises a coaxial annular portion containing a circumferentially arranged set of adjustable nozzles or vanes 28 which determine the angle at which the hot gases 286 will impinge upon the rotor blades 282 so as to vary the power imparted thereto. Each of the adjustable nozzle vanes 28 is rotatable about the axis of an associated spindle 288 extending generally radially from the axis of rotor or turbine wheel 20. Each spindle 288, journealled within the housing 12 by means of a suitable bearing 290, has its innermost end secured to the outermost end of the associated nozzle vane 28 in order to rotate the vane 28 about the spindle axis. The radially outer end of each spindle 288 is keyed to an arm 292 extending radially from the axis of the spindle 288 and terminating in a rounded portion 294 confined within a slot 296 formed in an adjusting ring 298.

The ring 298 extends coaxially about the adjacent conduit system 284 and is supported for rotatable adjustment about its center by means of a plurality of rollers 300 which are supported by an annular portion 302 on housing 12 and maintained circumferentially spaced thereabout by a roller cage 304.

FIG. 3 fragmentarily illustrates the manner in which the nozzle vanes 28 are adjustably positioned with respect to the power turbine vanes 282 by the action of the adjusting ring 298. The position of the adjustable vane 282 in FIG. 3 may be considered as depicting some intermediate engine operating condition.

FIG. 4 illustrates the adjusting ring 298 in axial end view with associated hydraulic cylinder assemblies 310 and 312 shown in cross-section. As shown cylinder assembly 310 is comprised of a cylindrical wall 314 with end plates or walls 316 and 318. A piston 320 is slideably received therein to form chambers 322 and 324 on opposed sides thereof. A piston rod 326 serves to connect piston 320 to a lever arm 306 carried by the ring 298. Hydraulic fluid ports 328 and 330 are respectively formed in walls 316 and 318.

Similarly, cylinder assembly 312 is comprised of a cylindrical wall 332 with end walls 334 and 336. A piston 338 is slideably received therein and forms chambers 340 and 342 on opposite sides thereof. A piston rod 344 serves to connect piston 338 to a second lever arm 308 carried by the ring 298. Hydraulic fluid ports 348 and 350 are respectively formed in walls 334 and 336.

A third lever arm 352, also carried by adjusting ring 298, is pivotally connected to one end of motion transmitting linkage means 354 which has its other end pivotally connected to an arm 356 secured to a rotatable shaft portion 358 of a potentiometer 360 as illustrated in FIG. 8. For purposes of illustration, the ring 298 in FIG. 4 may be considered as having been moved to one extreme position in the counter-clockwise direction and the lever arm 356 of FIG. 8 moved to a corresponding extreme position. This extreme position could, in turn, cause the variable nozzle vanes 28 to assume a position as generally fragmentarily illustrated in FIG. 5 which would represent a condition wherein maximum acceleration of the power turbine 20 is desired.

The other extreme position of the adjusting ring 298 could be in the clockwise direction an angular distance, for example, equal to 2X. This second extreme position could, in turn cause the variable nozzle vanes 28 to assume a position as fragmentarily illustrated in FIG. 6 which would represent a condition wherein maximum deceleration or braking of the power turbine 20 is desired.

The potentiometer 360 may be mounted on a suitable bracket 362 which is, in turn, carried by a stationary housing or cover member 364. The terminals of the potentiometer 360 are respectively connected to conductor means 366, 368 and 370 leading to the electronic control assembly 252 of FIG. 1.

FIG. 7 illustrates a valve assembly 372 and related structure employed for actuation and control of the piston and cylinder assemblies 310 and 312 of FIG. 4. The valve assembly 372 may be comprised of an outer housing 374, provided with inner annular grooves 376, 378, 380 and 382, which closely receives therein a sleeve-like member 384 which has outer annular grooves 386, 388, 390 and 392 formed therein. When assembled, as shown, a suitable support 394 is clamped and contained between the end of outer housing 374 and an enlarged cup-like end 396 of sleeve member 384 and annular grooves 376, 378, and 380 are brought into respective juxtaposition with annular grooves 386, 388 and 390 while annular groove 382 is placed in communication with a plurality of radially directed ports or conduits 398. The annular groove 382 is also connected, via conduit means 400 to hydraulic sump or reservoir 402 which may be considered to be at a low or sump pressure, $P_{10}$. The sleeve 384 also has a first plurality of circumferentially spaced radially directed ports or passages 406 communicating with groove 386 and a second plurality of circumferentially spaced radially directed ports or passages 408 communicating with groove 390. Similarly, groove 388 has a plurality of ports or passages 410 communicating therewith while juxtaposed annular groove 378 is in communication with a conduit 412 leading to a pump 414 and the hydraulic reservoir 402.

An axially adjustable spool-like valve 416, having a tubular body 418 with annular lands or rings 420 and 422, is slideably received within sleeve member 384. The ends of the valve 416 are enlarged cup-like portions 424 and 426 which respectively axially contain springs 428 and 430 which, in turn, are seated as against fixed members 432 and 434. As can be seen the lands 420 and 422, in cooperation with the ends 424 and 426 as well as the tubular body portion 418 and the interior of sleeve 384 define three annular chambers 436, 438 and 440 with chambers 436 and 440 being at sump pressure $P_{10}$ by virtue of conduit means 442 and 400 while chamber 438 is at a high pressure $P_8$ by virture of conduit 412, annular grooves 378 and 388 and conduit portions 410.

The interior 444 of valve 416 is also at the high pressure $P_8$ by virtue of the plurality of passages 446 formed in tubular body 418 and in communication with annular chamber 438, which end chambers 448 and 450, formed respectively at enlarged ends 424 and 426 of valve 416, are at respectively lower pressures $P_{11}$ and $P_9$. This is achieved by fixed restrictions 452 and 454 formed respectively in end member 432 and the left end of passageway 444 as well as restrictions 456 and 458 formed respectively in end member 434 and the right end of passageway 444.

A chamber 460, formed generally by the cup-like end portion 396 and a proportional solenoid assembly 462 received therein, may be considered as existing at substantially low sump pressure $P_{10}$ by virtue of passage portions 464 and 466 interconnecting chamber 460 with annular groove 382 and conduit means 400.

For purposes of discussion, the left end chamber 448 may be considered as existing at a substantially constant value of $P_{11}$ which is at a value between $P_8$ and sump pressure $P_{10}$ because of the fixed restrictions 454 and 452. However, the value of pressure $P_9$ will be variable depending upon the restrictive effects of the armature 468 of solenoid assembly 462. If the electrical signal placed on conductor means 470 and 472, from the electronic control 252, is such as to cause the armature 468 to more closely approach restriction 456, the flow therethrough will be further restricted causing pressure $P_9$ to increase the move spool valve 416 to the left. If the electrical signal placed on conductor means 470 and 472 should be such as to cause armature 468 to move further away from restriction 456, the flow therethrough will increase causing pressure $P_9$ to decrease permitting pressure $P_{11}$ at the other end to move spool valve 416 to the right.

A conduit 474, formed in outer housing 475, is shown to be in communication with conduit means 476 and 478 respectively leading to ports 330 (of piston asembly 310) and 348 (of piston assembly 312) while a second conduit 480, also formed in outer housing 374, is shown to be in communication with conduit means 482 and 484 respectively leading to ports 328 (of piston assembly 310) and 350 (of piston assembly 312).

Accordingly, in view of the above it can be seen that as armature 468 moves to the left pressure $P_9$ increases causing spool valve 416 to move to the left resulting in high pressure $P_8$ being communicated to conduit 474 and chambers 324 and 340 of pistoncylinder assemblies 310 and 312 via conduit means 476 and 478, respectively. At the same time, chambers 322 and 342 of assemblies 310 and 312 are vented to low return pressure $P_{10}$ via conduit means 482 and 484 communicating with conduit 480, annular chamber 440 and conduit means 400 leading to sump or reservoir 402. Consequently, high pressure $P_8$ is applied to pistons 320 and 340 causing counter-clockwise rotation of adjusting ring 298 from the then assumed position with a corresponding rotation of the adjustable nozzle vanes 28.

Also, when armature 468 moves to the right pressure $P_9$ reduces sufficiently to permit pressure $P_{11}$ to move spool valve 416 to the right and in so doing reverse the direction pressures in the piston assemblies 310 and 312 by now applying high pressure $P_H$ to chambers 322 and 342 thereby causing clockwise rotation of ring 298 and adjustable nozzle vanes 28.

Of course, as ring 298 so moves in either direction, linkage means 354 conveys the motion to potentiometer 360 of FIG. 8 which, in turn, creates an electrical feed back signal to the electronic control 252 indicative of the position of the variable vanes 28. When the vanes 28 have attained the particular position then desired, solenoid assembly 462 is fed a signal via 470 and 472 from the control 252 causing the armature 468 to move to a position placing spool valve 416 in a null position thereby maintaining the variable vanes 28 in the newly attained position.

Examples of such positions of vanes 28 might be as follows. If the power lever 246 is moved to a first position for engine cranking and starting, it would be desirable for the variable vanes 28 to be positioned as to present the least possible restirctive effect on the flow of gases therethrough until the engine gasifier section has attained idle speed. This would be desired because it would assure the greatest pressure drop across the compressor turbine wheel 18 thereby enabling the compressor to come up to speed in the quickest possible time. Accordingly, in such a situation, the speed signal, $N_g$, sensed and produced by probe assembly 266 would indicate to the electronic control 252 that the control should send a signal to solenoid assembly 462 in order to cause the ring 298 to be so turned as to have the vanes 28 positioned so as to present their widest most effective flow area. When such position is attained, the potentiometer 360 feed-back signal would effectively cancel-out the signal from the electronic control 252.

When idle speed is attained, signal $N_g$ would indicate to the control 252 that the vanes 28 should be moved to some position as, for example, in FIG. 3 where the vanes 28 are now slightly turned, reducing the effective flow area therebetween, and directing the hot gases flowing therethrough against the power turbine blades 282 at some minimal predetermined angle.

As the power lever 246 is rotated for additional power a signal, delivered via conductor means 250, indicates to the control 252 that the vanes should be turned a further amount to increase the angle of gas flow to the power turbine blades 282 in order to maintain the most efficient relative angle between the gas flow and blades 282. Again, the control system goes through the routine generally described above thereby placing the vanes 28 at the optimum position.

Another possible operating condition could be one where braking or deceleration of the power turbine 20 is desired. In such an instance, the power lever 246 would be rotated to indicate a request for reduced power or speed (even to idle) while the speed sense would be producing a signal $N_g$ which would indicate a higher than requested speed or power condition. With this basic set of signals it would then be possible for the control 252 to provide a signal to solenoid assembly 462 causing ring 298 to rotate to another extreme position wherein the vanes 28 would be positioned as depicted in FIG. 6 resulting in the hot gases impinging upon the power rotor vanes 288 in a direction opposing rotation thereof.

Other means may also be employed for sensing additional operating parameters and feeding signals representative thereof to the electronic control 252. For example, if desired, a suitable ambient temperature sensing probe 500 as well as second temperature sensing probe 502 immediately upstream of the variable nozzle blades or vanes 28 may be employed as shown in FIG. 1. The probe 502 could be employed in an overriding capacity. That is, when the temperature of the hot gas exceeds a predetermined maximum safe temperature, the signal from the probe 502 could be employed to cause the variable nozzle vanes 28 to open a slight additional amount to thereby reduce the back pressure on the compressor turbine 18 and thereby eventually cause a reduction in the rate of fuel flow to the gasifier section.

Even though the specific details of the electronic control 252 have not been disclosed, it should be apparent that in view of the disclosure made herein anyone skilled in the art could design the necessary circuitry which, as should be obvious, would include a plurality of electronic comparator circuits by which the input signals and feed-back signals would be compared in order to determine if the desired or requested condition has been attained.

Although only one preferred embodiment of the invention has been disclosed and described, it should be apparent that other embodiments and modifications of the invention are possible within the scope of the appended claims.

We claim:

1. A control system for a turbine engine having a gasifier section, a power output turbine and a variably openable nozzle assembly generally interposed between said gasifier section and said power turbine effective to at least at times variably restrict the flow to said power turbine of gases generated in said gasifier section, comprising fluid operating actuating means operatively connected to said variable nozzle assembly and effective to actuate said nozzle assembly to varying degrees of opening, servo valve means situated generally between a source of pressurized actuating fluid and said actuating means for controlling the flow of said actuating fluid to said actuating means, electrical control means including an electrical control circuit effective to vary the position of said servo valve means, additional means responsive to indicia operation of said turbine engine and the degree of opening of said nozzle assembly for in turn creating and applying a an electrical control signal to said electrical control means in order to thereby affect a desired movement of said servo valve means, and electrical feedback means responsive to the degree of opening of said variable nozzle means for operatively creating a feedback signal to said control means indicative of the then existing degree of opening of said variable nozzle means.

* * * * *